(12) United States Patent
Renero Quintero et al.

(10) Patent No.: US 8,989,357 B2
(45) Date of Patent: Mar. 24, 2015

(54) METHOD AND INFERENCE ENGINE FOR PROCESSING TELEPHONE COMMUNICATION DATA

(75) Inventors: Jesus Renero Quintero, Getafe (ES); Javier Maria Torres Ramon, Madrid (ES); Luis Osa Gomez Del Campo, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1048 days.

(21) Appl. No.: 12/921,059

(22) PCT Filed: Mar. 12, 2008

(86) PCT No.: PCT/EP2008/052951
§ 371 (c)(1),
(2), (4) Date: Sep. 3, 2010

(87) PCT Pub. No.: WO2009/112072
PCT Pub. Date: Sep. 17, 2009

(65) Prior Publication Data
US 2011/0007882 A1    Jan. 13, 2011

(51) Int. Cl.
*H04M 1/64* (2006.01)
*H04M 11/00* (2006.01)
*H04M 3/42* (2006.01)

(52) U.S. Cl.
CPC .... *H04M 3/42144* (2013.01); *H04M 2203/655* (2013.01)
USPC ................. 379/88.17; 379/90.01; 379/207.15

(58) Field of Classification Search
USPC ......................................... 455/310
See application file for complete search history.

(56) References Cited

U.S. PATENT DOCUMENTS

| | | | | |
|---|---|---|---|---|
| 6,005,927 | A * | 12/1999 | Rahrer et al. | 379/142.01 |
| 6,760,431 | B1 * | 7/2004 | Haimi-Cohen | 379/355.01 |
| 7,280,822 | B2 * | 10/2007 | Fraccaroli | 455/414.3 |
| 7,697,503 | B2 * | 4/2010 | Frederick | 370/351 |
| 7,733,232 | B2 * | 6/2010 | Light et al. | 340/573.1 |
| 8,160,532 | B2 * | 4/2012 | Vishwanathan et al. | 455/310 |
| 2002/0044642 | A1 * | 4/2002 | Danner et al. | 379/355.01 |
| 2007/0140141 | A1 | 6/2007 | Frederick | |

OTHER PUBLICATIONS

Orgnet.com. Social Network Analysis, A Brief Introduction. Retrieved from the Internet: http://www.orgnet.com/sna.html.

(Continued)

*Primary Examiner* — Joseph T Phan

(57) ABSTRACT

A method and an inference engine for processing telephone communication data of telephone parties of a telephone network are provided to allow better services and better allocation of resources in a telephone network. The inference engine comprises an obtainer for obtaining telephone communication data that associates telephone parties identifiable by telephone network identifiers with usage data that describes usage of one or more services of a telephone network. Further, the inference engine also comprises a generator for generating contact structure data for a set of the telephone parties based on the telephone communication data, wherein the contact structure data expresses a degree of connectivity between each member of at least a part of the set and one or more other members. The generated data gives the required information to improve services and resource allocation in the network.

27 Claims, 10 Drawing Sheets

(56) References Cited

OTHER PUBLICATIONS

Wikipedia. Social Network. Retrieved from the Internet: http://en.wikipedia.org/wiki/Social_network.

Sen, P. Complexities of Social Networks: A Physicist's Perspective. Department of Physics, University of Calcutta. Feb. 2006.

Derényi, I. et al. Clique Percolation in Random Networks. Apr. 20, 2005.

3GPP. $3^{rd}$ Generation Partnership Project; Technical Specification Group Services and System Aspects: 3GPP Enablers for Open Mobile Alliance (OMA); Push-to-Talk over Cellular (PoC) Services; Stage 2 (Release 7). 3GPP TR 23.979 v7.0.0 (Jun. 2007).

* cited by examiner

| | Alice | Bob | Carol |
|---|---|---|---|
| Alice | 0 | w2 | 0 |
| Bob | w1 | 0 | w4 |
| Carol | w3 | 0 | 0 |

METHOD AND INFERENCE ENGINE FOR PROCESSING TELEPHONE COMMUNICATION DATA

FIELD OF THE INVENTION

The present invention relates to a method and an inference engine for processing telephone communication data of telephone parties of a telephone network.

TECHNOLOGICAL BACKGROUND

In the internet, internet users provide private information voluntarily to internet based service providers, such as MySpace, Facebook etc., to present themselves to the internet community or friends. These service providers may use this information to build up a social network on the internet. The service providers may use this information to customize some of their services, namely provide the user with information or offerings relating to his/her interests.

In detail, social networks are social structures, generally described using graphs, and used to represent how individuals are connected to each other. Each individual is represented with a node, and his/her relations with the other individuals are the ties among them. Each tie can represent many different types of relations like, friends, money, family, trade, etc.

Many content and communication services are based today on the idea of exploiting the information derived from the "Six degrees of separation" concept. This hypothesis refers to the idea that everyone is no more than six "steps" away from each person on Earth. Hence, studies confirming it lead to the conclusion that the human society can be characterized by networks with short path lengths (small world phenomenon).

Social networking information (SNI) may be considered as data representing a structure of contacts and may normally be extracted out of network data. The type of networks used by internet services exploiting this concept are IP networks where the most likely services used are: web, email and chat. However, the network data used is the one generated when the user interacts with the service. In the case of Web traffic, the data is extracted from the logs the web server records. In the case of email, the logs used belong to the email server, and so on.

Popular internet services are taking advantage of extracting social network information out of their services to enrich the possibilities of interaction of their users. Further, they are also leveraging on the willingness of the users to make such information explicit to the services, in the so called 'networking' services.

In the example of the internet, users often provide the information by themselves according to their liking, which is thus only more or less reliable, and commonly also provide one or more contacts to the service provider.

Therefore, internet social networking services are based on explicit information provided by the end user, stating what their contacts in the network are.

However, from a telecommunication services point of view, telecom operators do not take advantage of this. Telecom operators are not extracting that information from their networks to make it available for the users, or even the services. Moreover, there exists no mechanism to engage in network data analysis with user explicit information on who are their peers, when they use communication services.

Further, there exists no mechanism defined to extract the relevant information out of a telecom network to build social networks from pure telecommunication services, such as voice calls, video calls, SMS, MMS and instant messaging.

Still further, the identity provided by members of an internet-based social network, e.g. when obtaining social networking information from online discussion services (IRC), cannot be compared to the relationships existing between subscribers of an access network and the telecom operator running that service. In the later, the real identity of the subscriber can be contrasted at any time and it is trusted, and even offered to third parties.

In user equipment, there exists the possibility to store call logs, but there is no possibility to process it to extract what is the structure of the owner's social network. That information is not even cross matched with the traditional address book application for that purposes, or with other internet services that share the same identity as the telecommunication provider's.

One existing service of a mobile telephone operator is to use special billing, when the mobile user is at a predefined home location. Here, the mobile user has to define in his contract which location, for example by ZIP code, should be considered his home location and is then billed at a different rate, for example a fixed line rate, when he is in the radio cell corresponding to his home location. However, this service also only uses pre-set information provided by the user.

Using not only the home location of a user, but also interactions between users should enable the provision of more valuable services to the user and enhance the attractiveness of using a telephone in a telephone network, instead of using the internet, for example.

As discussed above, telecom operators, however, have not taken advantage of the large amount of user information existing in a telephone network from the user's contacts so that social networking information has not been used for communication purposes.

SUMMARY

The present invention is thus aimed at providing an improved mechanism of processing telephone communication data to allow better services in a telephone network.

This is achieved by the subject-matter of the independent claims of the present application. Advantageous embodiments are described in the dependent claims.

According to one embodiment of the present invention, a method is proposed for processing telephone communication data, comprising obtaining telephone communication data that associates telephone parties identifiable by telephone network identifiers with usage data that describes usage of one or more services of a telephone network, and generating contact structure data for a set of said telephone parties based on said telephone communication data, wherein said contact structure data expresses a degree of connectivity between each member of at least a part of said set and one or more other members of said set. Accordingly, contact structure data for a set of telephone parties may be obtained, which gives information about the network, and in particular about the relationships between telephone parties in the network. For example, telephone parties having more connections and/or data intensive connections, may be provided with more bandwidth. Further, telephone parties with a high degree of connectivity, for example, certain businesses, may be provided with a dedicated line. Consequently, telephone network resources may be allocated more efficiently and better services to the telephone parties may be automatically provided.

According to another advantageous example, the contact structure data is analyzed to identify a subset of said set of telephone parties, preferably based on interactions between said telephone parties. Interactions may be obtained from the telephone communication data and may be considered as a contact between one telephone party and at least another telephone party. Accordingly, a subset of telephone parties is obtained and services may be provided individually for this one subset. For example, special security features may be provided for the connections between members of a subset in the telephone network.

According to another advantageous example, the contact structure data is analyzed to identify a cluster of telephone parties of said set. Further, the telephone parties of the cluster may have a degree of connectivity above a certain connectivity threshold or a number of links to other telephone parties above a certain link threshold or both. Accordingly, telephone parties with a degree of connectivity above a certain connectivity threshold, may be provided with a dedicated line. Further, for example, telephone parties with a number of links to other telephone parties above a certain link threshold may be provided with an extra service, such as a multi-party service. For example, a conference call feature to enable communication with more than one of the linked telephone parties at once.

According to another advantageous example, a network service of a telephone party is adjusted based on the analysis of the contact structure data. Preferably adjusting such a network service comprises at least one of providing a secure communication for said telephone party, increasing the throughput of the communications of said telephone party, adapting a service charge for said telephone party and adapting a multi-party service to said telephone party. Accordingly, the flexibility of the service offerings of the telecom operator may be increased.

According to another advantageous example, the contact structure data is representable as a graph of nodes connected by edges, where each node corresponds to a member of said set and a given edge expresses a degree of connectivity between nodes connected to said given edge. Accordingly, contact structure data may be visualized.

According to another advantageous example, the degree of connectivity is represented by a weight for a link between a member of at least a part of the set and another member of the set. The connectivity may be undirected or directed, which means that the degree of connectivity is the same for each direction between two members or different for each direction between two members, respectively. Accordingly, various relationships between telephone parties may be described with a connectivity, namely a bond strength and a direction of this strength.

According to another advantageous example, the usage data includes information on an interaction between the telephone parties through the telephone network, wherein the information on an interaction relates, for example, to an interaction in a service comprising at least one of: voice call, video call, SMS, MMS, multimedia service, and instant messaging; and/or to information obtained from a location service. Accordingly, defining a special service used in an interaction between telephone parties, allows obtaining better information about a good allocation of resources in the telephone network, such as bandwidth, e.g. for video call service or delay requirements of a line. For example, with SMS or MMS, it is not necessary to provide data transmission instantaneously, but a SMS or MMS may be sent in a certain time window whenever bandwidth is available.

According to another advantageous example, the usage is associated with at least one of duration, frequency and absolute number of interactions. Accordingly, this information allows better assessing of different bandwidth requirements of different parts of the telephone network.

According to another advantageous example, a telephone party is a trusted telephone party with a trusted telephone network identifier, wherein the telephone network identifier may constitute a unique identifier providing a unique identification in the telephone network. Accordingly, in contrast to the internet, it is possible to trust telephone parties, which are identifiable and usually have entered into a contract with a telecom operator, for which proof of identity was required.

According to another advantageous example, apart from using telephone communication data, contact structure data for a set of telephone parties is further generated based on a location of a telephone party or party equipment data of the telephone party, wherein the party equipment data can relate to a capability of the party equipment, e.g., WLAN or Bluetooth enabled, or to contact information stored in the party equipment. Accordingly, the flexibility of providing more services is increased. For example, party equipment with WLAN, such as a WLAN enabled mobile phone, may be provided with large data files through WLAN instead of data transmission through GSM, UMTS or similar.

According to another embodiment, an inference engine of processing telephone communication data comprises an obtainer for obtaining telephone communication data that associates telephone parties identifiable by telephone network identifiers with usage data that describes usage of one or more services of a telephone network, and a generator for generating contact structure data for a set of said telephone parties based on the telephone communication data, wherein said contact structure data expresses a degree of connectivity between each member of at least a part of said set and one or more other members of said set. Accordingly, means are provided to generate contact structure data giving information on the relationships of different telephone parties so that telephone network resources may be allocated more efficiently and better services to the telephone parties may be automatically provided.

According to another embodiment, a program may be provided including instructions adapted to cause data processing means to carry out a method with the above features.

According to another embodiment, a computer-readable medium may be provided, in which a program is embodied, where a program is to make a computer execute the method with the above features.

According to another embodiment, a computer program product may be provided comprising the computer-readable medium.

Further advantageous features of the invention are disclosed in the claims.

DETAILED DESCRIPTION OF THE PREFERRED EMBODIMENTS

Preferred embodiments of the invention are described with reference to the figures. It is noted that the following description contains examples only and should not be construed as limiting the invention.

Embodiments of the invention generally relate to obtaining telephone communication data, which gives information about the user of a telephone network, when different telephone parties or users interact with each other through a certain service, such as a voice call, video call, SMS, etc., to generate contact structure data describing, for example, the strength of a connection between telephone parties by a degree of connectivity. Briefly said, the generation of contact structure data gives an insight of the relationships between telephone parties in a network, such as information based on the duration, the frequency and number of interactions between telephone parties. Subsequently, network services may be provided according to the needs of the telephone parties.

Figure 1:
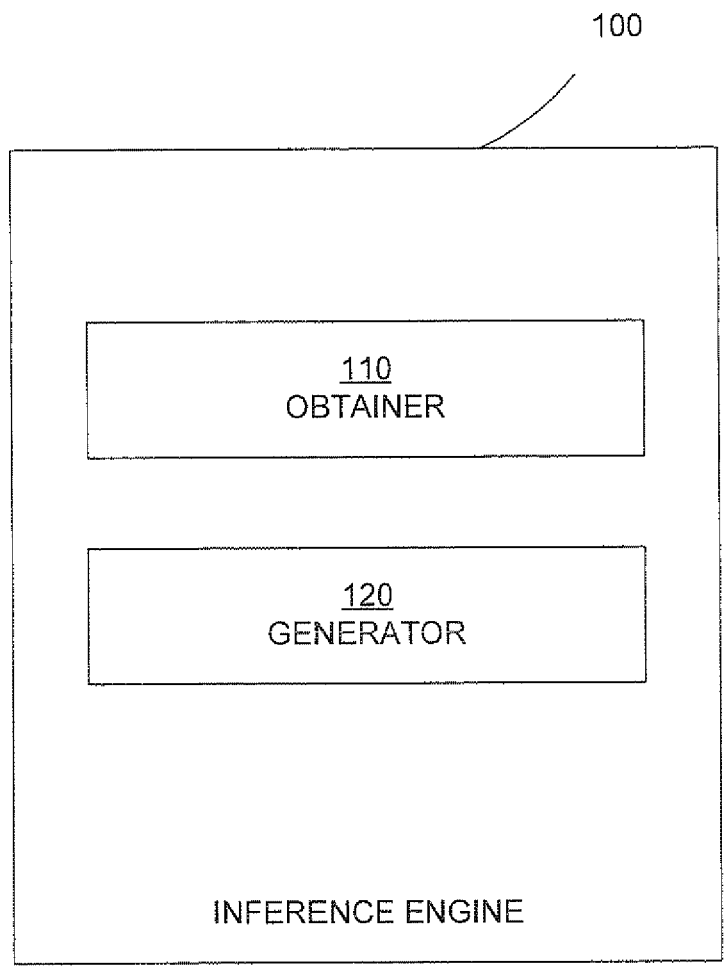
FIG. 1 illustrates elements of an inference engine according to an embodiment of the invention.

FIG. 1 illustrates elements of an inference engine 100 according to an embodiment of the invention, comprising an obtainer 110 and a generator 120. An inference engine within the meaning of the present application and the claims is any entity that derives or deduces structured information from a large amount of raw data, such as data generated by a telecom operator.

The obtainer 110 and the generator 120 are connected suitably, preferably internally, to transfer data. Further, the inference engine 110 may comprise some kind of controller, not shown, to control the operations of the obtainer 110 and generator 120.

The obtainer 110 obtains telephone communication data that associates telephone parties identifiable by telephone network identifiers with usage data that describes usage of one or more services of a telephone network.

It should be understood that as an obtainer, any suitable unit may be used that collects data or accesses a database in which data is already collected. In more detail, as will be discussed below, the obtainer 110 may be directly connected to a telephone network to collect data of the telephone network, such as telephone communication data that associates telephone parties with usage data. Telephone communication data can also be obtained by accessing a database including already collected data, similar to databases used by telecom operators operating the telephone network.

It is noted that the telephone network within the meaning of the present invention is not restricted to being operated by only one telecom operator, but may comprise a plurality of networks operated by different operators as long as a commonly understandable identification scheme is available, such as E.164 or IMSIs. Therefore, the obtainer 110 may also access more than one database of more than one telecom operator to obtain telephone communication data.

The telephone party itself can be a real person such as a user of the network, a machine, a server, etc., i.e. anyone or anything capable of communicating via the telephone network and being identifiable, for example by a telephone identifier, which may be a phone number, an IMSI or the like. For example, a user may also interact with a media or information provider, instead of another user.

Once telephone communication data is obtained by the obtainer 110, it may be further processed. This processing may be performed by the generator 120, which receives telephone communication data from the obtainer 110 and generates contact structure data for a set of the telephone parties based on the telephone communication data. The thus generated contact structure data expresses a degree of connectivity between each member of at least a part of the set and one or more other members of the set.

As discussed above, the telephone network may be operated by different operators so that one database will generally not cover all users for which usage data is available, and thus contact structure data may be limited to a set of telephone parties due to possible limitations, e.g. to users of a given operator or also of a certain geographical area, e.g. country, etc.

The degree of connectivity between two members of the set may be described by a weight between them in the network representing their relationship and will be explained in more detail with respect to FIGS. 6A and 6B. Further, the connectivity may be directed, e.g. party A contacts party B but party B does not contact party A, which will also be explained in more detail with respect to FIGS. 6A and 6B.

If the connectivity is directed, it is not necessary that the data contains a degree of connectivity from each set member to each other set member; in other words, some parties may only have the role of receivers, but are not sources. Therefore, in some cases only the degree of connectivity of a part of the set is derivable from the contact structure data.

In a general case, the generator 120 may be constituted by processing means with an appropriate interface, which is adapted to carry out the function of generating contact structure data by software and/or hardware. This function may be changed or extended by software update or hardware configuration.

The function of the processing means of the generator 120 may be realized by a microprocessor, computer, field programmable gate array (FPGA) or integrated circuit, such as an ASIC (application specific integrated circuit) but are not limited thereto.

Therefore, it should be understood that the obtainer 110 and the generator 120 may not necessarily be two physically different units, as shown in FIG. 1, but the obtainer 110, which may be regarded as an input interface of the inference engine, may be integrated with the generator 120 in a suitable form realized by software, hardware or a combination thereof to achieve their above described functions.

Figure 2:
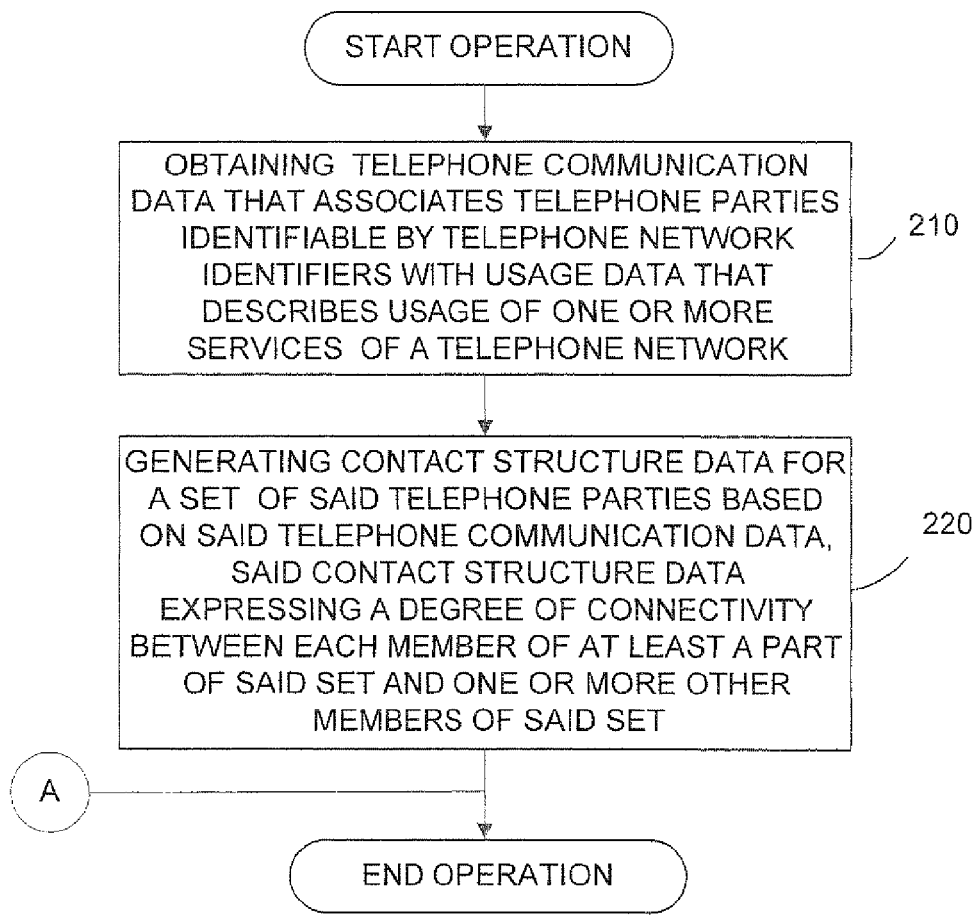
FIG. 2 illustrates operations of a method of processing telephone communication data according to an embodiment of the invention.

In the following, operations of the inference engine 100 will be described with regard to FIG. 2. FIG. 2 illustrates a flow diagram of operations of a method for processing telephone communication data, such as during operation of the inference engine shown in FIG. 1.

In a first operation 210, when starting operations, telephone communication data is obtained. This data associates telephone parties which may be a user or also a server, identifiable by telephone network identifiers, with usage data that describes usage of one or more services of a telephone network.

For example, usage data includes information on an interaction between telephone parties through a telephone network. Here, interaction may be defined as a contact between one telephone party and at least another telephone party, wherein a weighted interaction between two parties may be associated with a certain degree of connectivity. In other words, it is desired to obtain information about how parties relate to each other, i.e., what services they use to interact, the geographical proximity between them, the proximity in the social network, etc.

The information on an interaction, for example, relates to an interaction in a service, such as voice call, video call, SMS, MMS, multimedia service, instant messaging, location service and the like.

Further, the usage may be associated with a duration, frequency or absolute number of interactions or a combination thereof. For example, a mechanism to build a social network structure from contact structure data for each telephone party in the telephone network may be based on recording the ratio of both outgoing call duration and incoming call duration for one party to another party and from the one party to the other party, respectively, calculated over the total of outgoing call duration and incoming call duration for a party. Furthermore, location based information can also be used to derive proximity to other parties of the network.

In a simple example, telephone communication data from a database of a telecom operator may be obtained, in which telephone parties with their phone numbers are listed together with the type of service used, such as voice call or SMS as well as the length of time the service has been used.

In operation 220, this telephone communication data may then be processed to generate contact structure data for a telephone party belonging to the telecom operator of the database. The contact structure data may provide different degrees of connectivity to other telephone parties interacted with. Not all of the other telephone parties have to belong to the same telecom operator to define contact structure data for the one telephone party so that contact structure data may only be obtained for the parties belonging to one telecom operator.

For example, in the case of a directed connectivity, which will be discussed in detail with respect to FIG. 6, a degree of connectivity to another telephone party may be obtained by analyzing how often the one telephone party has contacted the other telephone party, the length of the interaction between the two or the frequency of the interactions in a certain time period. Subsequently, a better allocation of network resources may be projected to improve the service quality offered by the telecom operator.

In the following, the operation of the inference engine 100 and how it can be applied and extended, will be described with respect to FIGS. 3A and 3B.

Figure 3A:
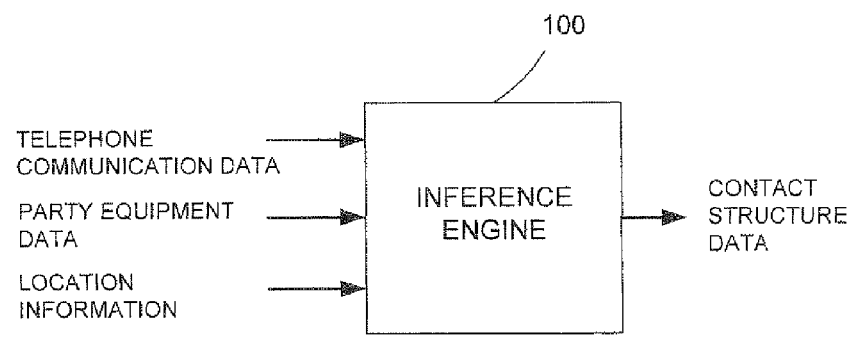
FIGS. 3A and 3B illustrate an operation and an application of elements of an inference engine, respectively, according to another embodiment of the invention.

In FIG. 3A, it is schematically shown what kind of information may be used to derive contact structure data.

For example, telephone communication data, party equipment data and/or location information may be used alone or in combination in different ways to extract metrics, which can help a telecom operator to adapt service offerings after informing the user or automatically.

Generation of contact structure data from telephone communication data has been described in detail above and it is referred to the above discussion for more detailed information. Generation of contact structure data from the location of a telephone party may also be used to provide location based services, such as guiding a mobile telephone user to a place of interest or provide information about the current location, which may be adapted as a push service.

Further, generation of contact structure data from party equipment data may provide information about the capabilities of the party equipment. For example, the party equipment, such as a mobile telephone, is WLAN or Bluetooth enabled and hence data intensive applications may be provided over WLAN or Bluetooth from a certain node and not GSM or UMTS, etc.

In this example, it is especially interesting to combine location information and the knowledge of the capability of the party equipment, so that the telecom operator may find out whether there is actually a WLAN node in the proximity of the equipment user.

Furthermore, it is also feasible to share contact information stored in the party equipment such as the address book in a mobile telephone with the telecom operator to enable to use this information to generate contact structure data. This information may otherwise not be obtainable, if the contact information has not been used lately or is not used at all for telecommunication purposes. Thereby, it is possible to synchronize the address book information with the information stored at the telecom operator, which may otherwise not be directly extractable from the telephone network. This will be explained later in detail with respect to FIG. 9.

Figure 3B:
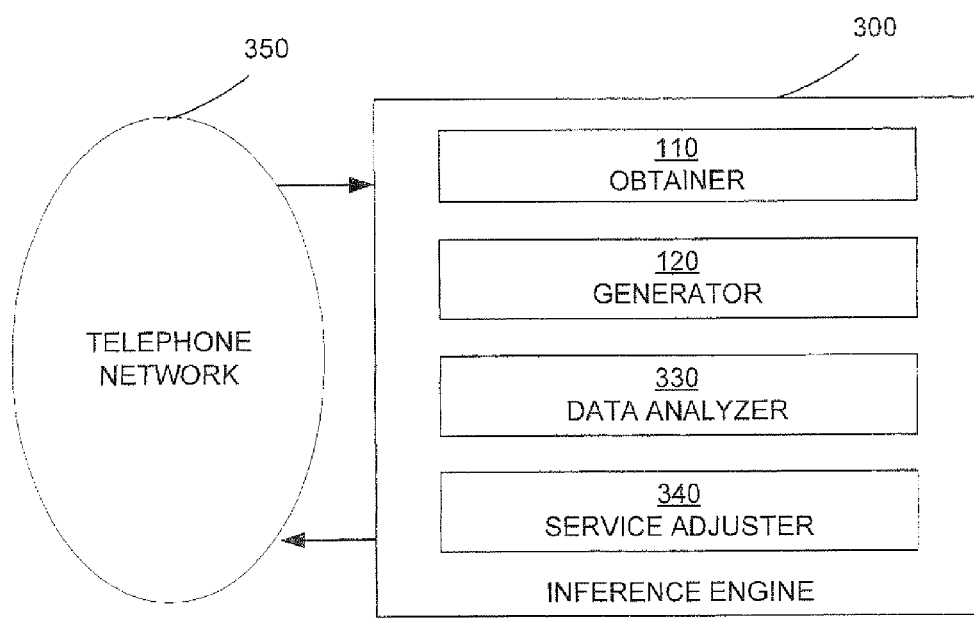

FIG. 3B illustrates an application of an inference engine according to another embodiment of the invention. In this case, the inference engine 300 shown in FIG. 3B is a modified version of the inference engine 100 of FIG. 1.

The inference engine 300 comprises an obtainer 110, a generator 120, a data analyzer 330 and a service adjuster 340. The obtainer 110 and generator 120 are basically the same as discussed above with respect to the inference engine 100 of FIG. 1.

The data analyzer 330 analyzes the contact structure data generated by the generator 120 and provided internally in the inference engine 300 to the data analyzer 330. The data analyzer 330 may analyze the contact structure data in several different ways. For example, the data analyzer may identify a subset of the set of telephone parties, e.g., the set associated with a telecom operator or a geographical area, as discussed above.

According to one specific embodiment, the subset can be a community or clique comprising at least two parties, and the analysis may be performed using a known clique percolation method.

In detail, a community may be defined as a subset of users with more interactions between themselves than with the rest of users of a network. Further, a clique may be defined as a subset of users that are connected with links to at least all other members of the clique expect one. In terms of graph theory, which will be explained in detail with respect to FIG. 6B, a clique is a well delimited subgraph of the community, whereas the community in turn is a loosely delimited subgraph of the whole social network. For example, Clique Percolation Clustering, which has been published by Derényi, I. et al (2005) "Clique Percolation in Random Networks", Phys. Rev. Lett. 94, 160-202, is a technique that aims to group cliques together, in order to detect communities and may be used in the present case.

In another embodiment, the contact structure data is analyzed and the results may be output as a number of different metrics. Types of metrics that may be used are discussed in the paper by Derényi and include: betweenness, clustering coefficient, reach, detected cliques, detected clique percolation clusters, detected communities, etc.

The metric "detected cliques" can be used for multi-party services and will be discussed with respect to FIG. 7. Betweenness is a metric that defines the importance of a node in a network and the more the betweenness, the more important is the node. In other words, the betweenness may give information about the number of strong connections of a party, i.e. connections with a high weight. A node with high betweenness connects different communities and may sometimes be called "social gateway".

All these metrics have in common that they may be derived from an analysis based on interactions between telephone parties. As discussed above, these interactions are obtainable from the telephone communication data and may be described as contacts between different parties.

In another embodiment, the contact structure data may be analyzed by the data analyzer 330 to identify a cluster of telephone parties. Such a party cluster may comprise one or several telephone parties, e.g. also a social gateway. A party being a social gateway usually has a high betweenness and a number of links to other telephone parties above a certain link threshold giving a high centrality degree as a measure of relative importance of a party. For automation purposes, instead of a certain predetermined threshold, parties may be considered a social gateway with a betweenness above a calculated average of the whole network.

Further, a party cluster may be defined by a certain number of telephone parties having a degree of connectivity above a certain connectivity threshold. Such a party cluster may then be viewed as parties with strong connections.

However, it should be understood that although the degree of connectivity has been defined previously as the weight between two parties representing their relationship, it is also feasible to define connectivity as several connections from one party to a certain number of other parties having all a certain weight.

Subsequently, after the contact structure data has been analyzed, as described above, a network service of one or several telephone parties may be adjusted based on the analysis of the contact structure data.

For example, after analysis, a secure communication for one telephone party to communicate with another telephone party may be provided or the throughput of the communication between two telephone parties may be increased. This may be achieved by providing a dedicated line to the two telephone parties, which may be useful for a company with offices at different locations. Furthermore, a service charge for a telephone party may be adapted. This may be achieved by offering a telephone party contacting always the same parties different rates for communication when always communicating with the same parties.

An example of adapting the service to provide a direct/favourable communication path, which, as a further option, can preserve privacy of a contacted party, will be described with respect to FIG. 12. Another example regarding changing a multi-party service will be described with respect to FIG. 13 to optimize service offerings and tailoring them to the actual contacts of the telephone parties.

As can be seen from FIG. 3B, the inference engine 300 has to be connected in some way to the telephone network 350. As described above, the telephone network is not restricted to being operated by only one telecom operator, but it may comprise of a plurality of networks operated by different telecom operators.

The inference engine 300 may be connected to the telephone network 350 according to the requirements of the architecture used in the telephone network. For example, the telephone network may be organized hierarchically so that the inference engine 300 may be connected to a central exchange. However, it is also feasible to connect to or access a main storage, e.g. a mainframe computer, of the telecom operator, in which telephone communication data are already stored. This data is then obtained by the obtainer 110 and may be processed to generate contact structure data by the generator 120, which is then subsequently analyzed by the data analyzer 330 so that a network service for the telephone network 350 may be adjusted by the service adjuster 340, as can be seen in FIG. 3B.

Details related to the number and kind of servers that can be (directly or indirectly) connected to the inference engine 300 in network 350 does not affect the invention, as long as information as described in this application is collected in the inference engine 300 from said network 350.

In a preferred embodiment, communications between entities in network 350 and the inference engine 300 is according to a well known extendable protocol, such as RADIUS protocol or DIAMETER protocol. Also these communications can be accomplished according to LDAP protocol. Data to be obtained by the inference engine 300 from party equipment (not shown in FIG. 3B), such as capabilities of a user terminal, address book information, etc., can be collected via a well-known data synchronization protocol, such as SyncML, directly or indirectly from the inference engine 300, and/or be sent to the inference engine by another entity in the network 350 acting as a SyncML endpoint for the party equipment via another protocol.

This process may be viewed as a constantly repeating process of obtaining raw data, generating structure data, analyzing the structure data and again adjusting a service so that a high degree of service customization may be achieved for the telephone parties of the telephone network. The customization itself may then be performed automatically.

In the following, further embodiments of the invention will be described with regard to FIGS. 4 and 5, particularly illustrating modifications of the method previously discussed with respect to FIG. 2.

Figure 4:
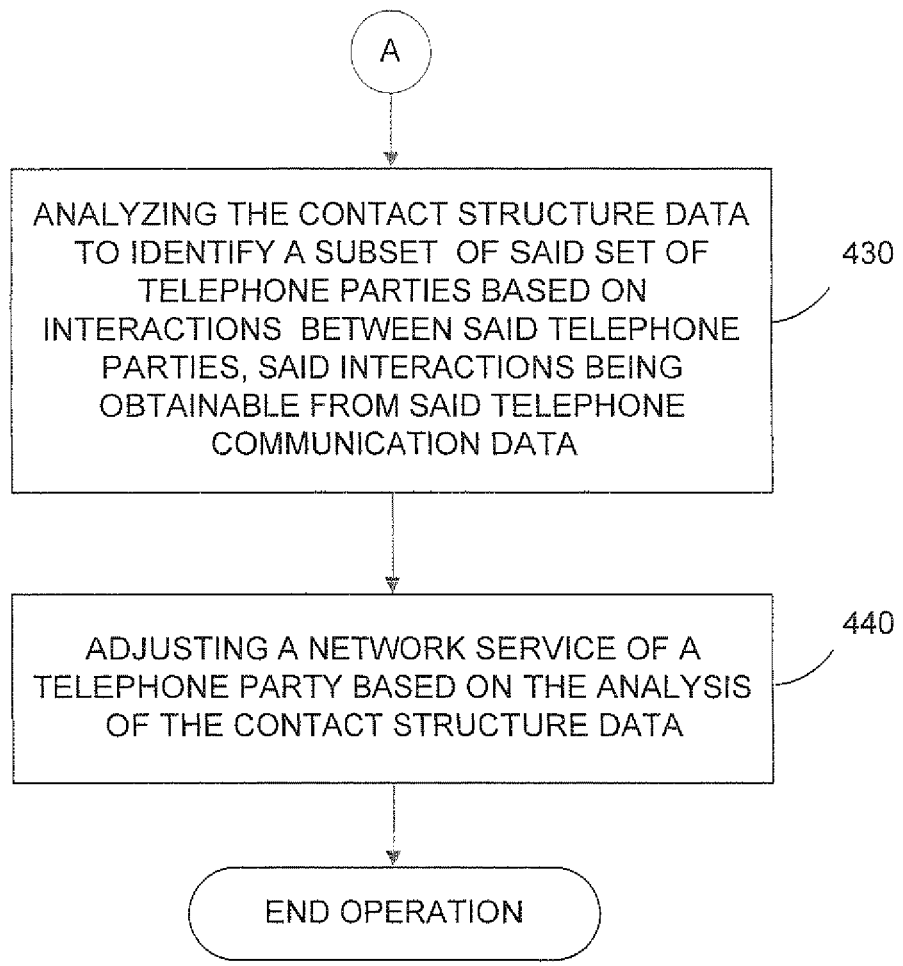
FIG. 4 illustrates operations of a modification of the method shown in FIG. 2.
Figure 5:
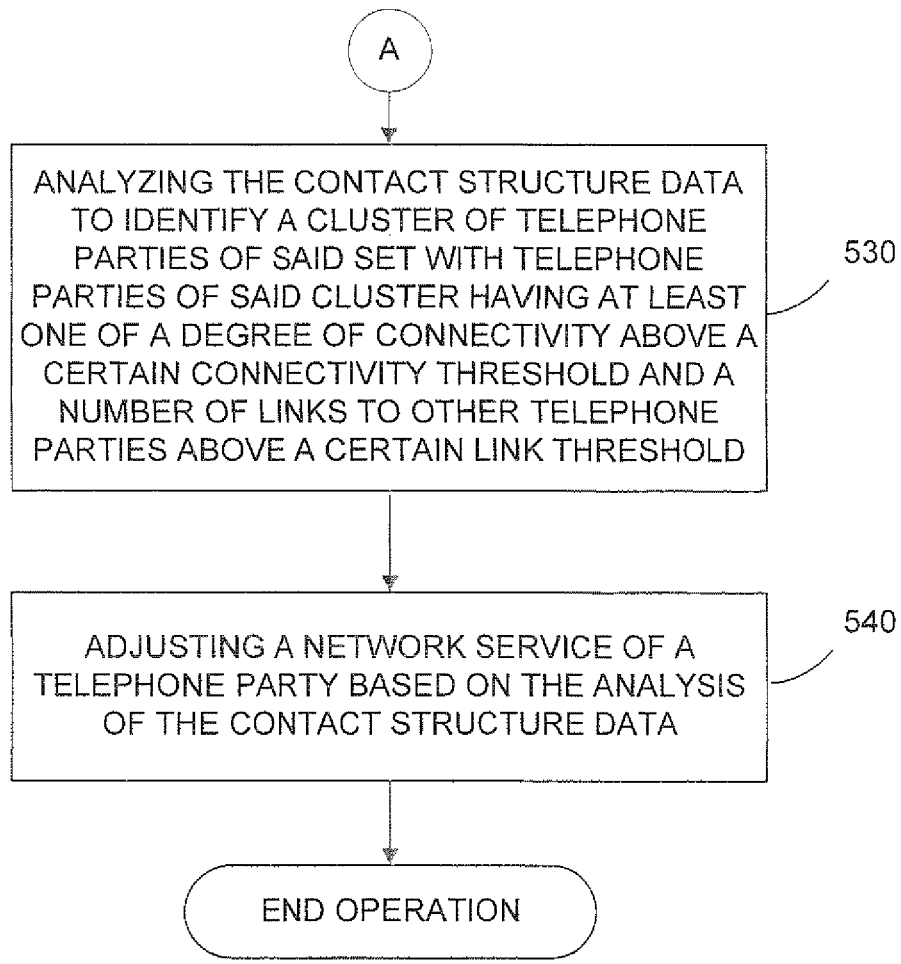
FIG. 5 illustrates operations of a modification of the method shown in FIG. 2.

In these methods of FIG. 4 and FIG. 5, the operations 210 and 220 are the same as previously discussed with respect to FIG. 2 and a detailed explanation thereof will be omitted. In short, FIGS. 4 and 5 particularly explain aspects of the analysis of the contact structure data and adjusting a network service accordingly.

In an operation 430 of FIG. 4, which follows operations 210 and 220 of FIG. 2 the contact structure data is analyzed to identify a subset of the set of telephone parties based on interactions between the telephone parties. As discussed in detail above, the interactions may be obtainable from the telephone communication data belonging to a telephone network.

For example, in the analysis it may be evaluated which telephone party interacts with which other telephone party so that one or multiple subsets may be defined indicating which telephone parties interact with each other. Further, specific subsets may be a community or a clique, as described above.

In an operation 440, a network service of a telephone party is adjusted based on the analysis of the contact structure data performed in operation 430. Here, several possible adjustments are feasible, which have been described above and detailed examples of some network services will also be given below.

FIG. 5 describes a more concrete analysis of contact structure data.

In operation 530, the contact structure data is analyzed to identify a cluster of telephone parties of the set. Then, it may be determined whether a degree of connectivity is above a certain connectivity threshold. In detail, degrees of connectivity of different telephone parties of the set may be reviewed and a party cluster may be defined by telephone parties all having a degree of connectivity above a predetermined connectivity threshold. This may indicate telephone parties actively using the telephone network, if it is assumed that the degree of connectivity is dependent on the usage, such as duration, frequency, absolute number of interactions, etc., which may define the weight.

Additionally or alternatively a party cluster may be defined for parties having a number of links to other telephone parties above a certain link threshold. In detail, parties that use a telephone network actively in terms of contacting a lot of different other telephone parties may be grouped together to a party cluster, which may indicate the importance of a certain party.

However, it should be understood that several other possibilities exist for grouping telephone parties to a subset or party cluster or similar. For example, it is also feasible to group telephone parties which largely use the same service, such as video call, and offer them more bandwidth for communication.

According to the analysis and the definition of a subset or cluster, a network service may then be provided or adjusted as shown in previously discussed operation 440 or operation 540 in FIG. 5.

In the following, contact structure data, and especially a representation of contact structure data to improve the understanding thereof, will be described with respect to FIGS. 6A and 6B.

Figures 6A, 6B:
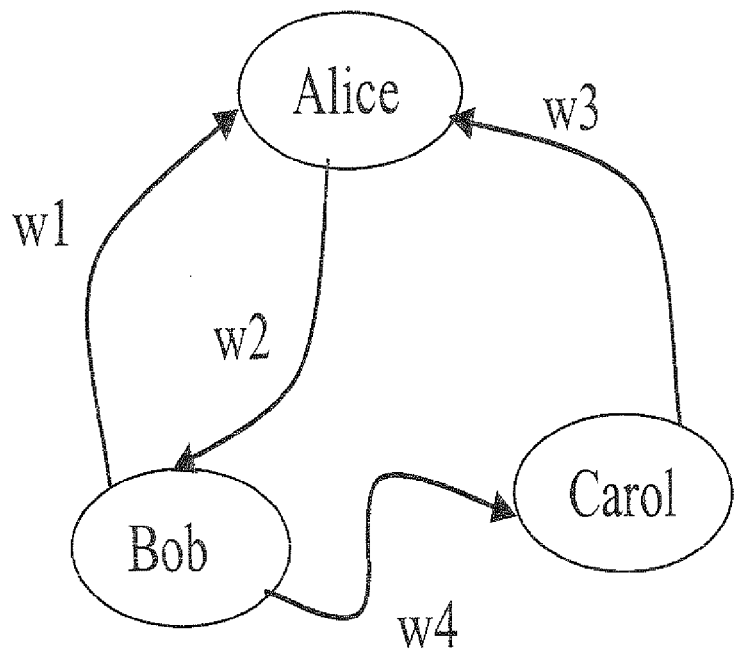
FIGS. 6A and 6B illustrate representations of contact structure data as a graph and a matrix, respectively.

In FIG. 6A, contact structure data is explained with the help of graph theory. Here, contact structure data is represented as a graph of nodes connected by edges, where each node corresponds to a member (party) of a set and a given edge expresses a degree of connectivity between nodes connected to the given edge.

Note that graph theory is not the only way contact structure data can be represented in, but the data may be also representable in different other ways, which is discussed below with respect to a matrix representation of FIG. 6B.

In FIG. 6A, three nodes or telephone parties named Alice, Bob and Carol are shown, which are connected by links, which may be called edges in the graph representation. Further, an edge may be provided with a weight to represent the degree of connectivity from one node to the other.

For example, the edge between Carol and Alice with the weight W3 specifies a direction with a specific weight from Carol to Alice. However, there is no edge indicating a direction from Alice to Carol so that the connectivity in this case is directed and there is only one degree of connectivity between Carol and Alice, namely the connectivity with the weight W3 directed from Carol to Alice. This indicates that Carol interacts with Alice according to a certain weight, for example Carol calls Alice but Alice does not call Carol.

Similarly, such a directed connectivity is shown for Bob contacting Carol with a weight W4. In these two examples, the connectivity is not symmetrical. In the case of Alice and Bob, however, Alice contacts Bob and Bob contacts Alice, the connectivity would be symmetrical, if the weight W1 is equal to the weight W2 indicating that the connectivity is undirected. Otherwise, if the weights W1 and W2 are different, the connectivity would not be symmetrical.

In the example of FIG. 6A, it is seen that Carol is not as "important" in the network as Alice or Bob, since the other two nodes have more interactions. Accordingly, a measure of the relative importance of a node within a graph, called "centrality", may be introduced measuring the amount of paths or shortest paths between any two nodes in a graph in which the specific node is located.

Further, with the concept of directed and undirected connectivity, interactions between two parties may be differentiated between party A contacts party B only, party B contacts party A only or party A contacts B and party B contacts party A, wherein in the last case the weight from A to B and B to A can be different (directed) or can be the same (undirected).

Figure 7:
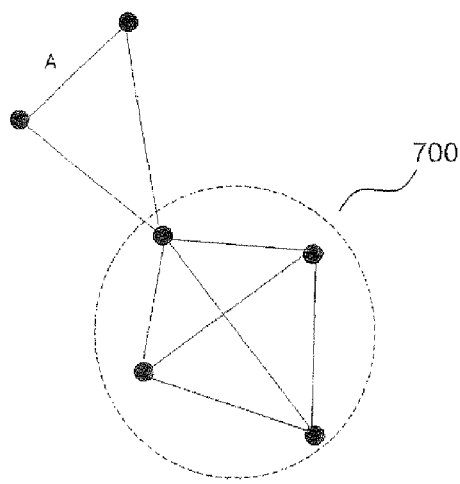
FIG. 7 illustrates a 2-clique situation exemplifying embodiments of the present invention.

In FIG. 7, a multi-party service is described using graph theory. In this example, contact structure data may be used in connection with a multi-party service, such as push-to-talk (PTT). Multi-party services are designed to allow parties to communicate easily. However, previously, the provision of these services relied on the user manually defining their contacts. By analyzing contact structure data k-clique percolation clusters may be detected in order to define new subsets of contacts or modify existing subsets. In the context of a graph, a k-clique percolation cluster is a group of k-cliques (where a k-clique is a complete subgraph, that is a subgroup of k nodes connected in full mesh, of index k), that pairwise differ only in one member.

For example, the telecom operator may use the information on detected k-clique percolation clusters or the parties themselves could be alerted by the system, in order to update or modify their profile or their PTT group, for which an example will be given with respect to FIG. 13.

In FIG. 7, a 2-clique situation is shown with the parties inside the circle 700 representing parties of a PTT group, since they are aware that they communicate not only point-to-point but also between all members of the group.

The analysis of the contact structure data can detect link A between two parties also having interactions with one of the PTT parties. This may transform them into a new clique for this party that may then be alerted and offered to provide the new contacts as a new PTT group or enlarge the existing group.

Therefore, it may be advantageous to alert parties whenever their inferred contact structure data indicates an update of their provision profile. For example, a contact list of the address book of the party equipment may be updated or the multi-party service group may be changed. The alert may be provided by receiving an SMS, a synchronization protocol, e.g. SyncML, or the like. For example, the update or change may also be performed automatically so that the user does not have to act but may be given information about the update or change to be able to interfere if the update or change is not desired.

Finally, in graph theory several metrics may be defined. For example, a clustering coefficient in the context of a graph, given the neighbourhood of a node N (those nodes that connect to N), is given by the amount of existing links between those nodes divided by the amount of potential links between them. Further, "reach" indicates the amount of nodes that can be reached traversing edges from a given node.

In FIG. 6B, the same information as provided by the graph in FIG. 6A is presented in a different way. Here, a matrix is shown with the names in the left column indicating "from" and the names in the upper row indicating "to" so that also directions of the different weights from one person to the other are defined, similar as the arrows of the edges in the graph of FIG. 6A.

It is noted that a structured multi-level extended contact data model, such as the above-discussed contact structure data model, is any abstract data type allowing to represent one party's connections and bond strengths to other parties, as well as traversing from one party to another via their connections. Note that any two data types providing exactly this information or equivalent, such as the weighted directed graph of FIG. 6A and the matrix with the weights of the connections of FIG. 6B. Here, both representations comprise the same usage data including information on interactions between telephone parties.

In the following, operations of an inference engine according to another embodiment of the invention will be described with respect to FIG. 8.

Figure 8:
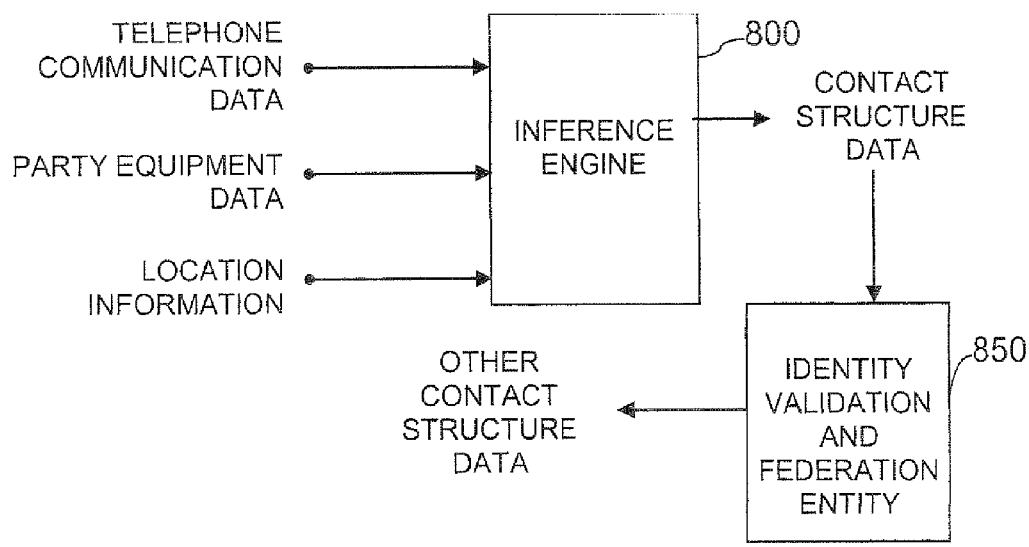
FIG. 8 illustrates operations of an inference engine according to another embodiment of the invention.

In particular, FIG. 8 will discuss the aspect of security and identity validation. Since a telephone party is usually a trusted telephone party with a trusted telephone network identifier, which is obtainable by the telecom operator, this identity can be federated among different services of the telecom operator and others associated through service level agreements. Federation of social networks between different services and operators may thus be achieved.

An example is shown in FIG. 8, where telephone communication data, party equipment data and location information is obtained by the inference engine 800 and processed to generate contact structure data. In a subsequent step, for example in the identity validation and federation entity 850, which can be an identity provider as described in the specifications of the Liberty Alliance Project, contact structure data may be further processed. In this further processing the identity may be validated and/or federated to obtain other contact structure data based on trusted telephone network identifiers.

For example, the Liberty Alliance Project (LAP) supports federated identity management allowing users of Internet-based services and e-commerce applications to authenticate and sign-on to a network or domain once from any device and then visit or take part in services from multiple Web sites. This federated approach does not require the user to reauthenticate and can support privacy control established by the user.

Furthermore, the identifier of a telephone party is not only a trusted identifier but usually also unique providing a unique identification in a telephone network so that no ambiguity in the identity exists.

Therefore, social networking information of a party, such as contact structure data associated with a party, may be delivered using LAP standardized mechanisms for web services federation framework WSF.

It should be understood that the identity validation and federation entity 850 may also form part of the inference engine 800, its functions may be integrated in a unit performing the functions of the inference engines discussed previously.

Figure 9:
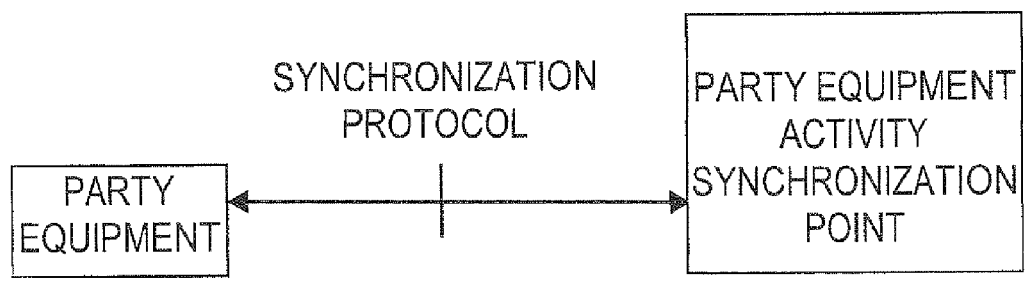
FIG. 9 illustrates a method for synchronization according to another embodiment of the invention.

In FIG. 9, an example of a method is illustrated for synchronization of the information used by the inference engine depicted in FIGS. 1, 3A, 3B and 8, such as party equipment data.

Using a synchronization protocol as shown in FIG. 9 allows a party to share information that may not be directly extractable from the telephone network in order to complement the needed data to form a social network structure, which has been described before with respect to address book information of a party equipment. As illustrated, a synchronization protocol may be used between the party equipment and a party equipment activity synchronization point.

Figure 10:
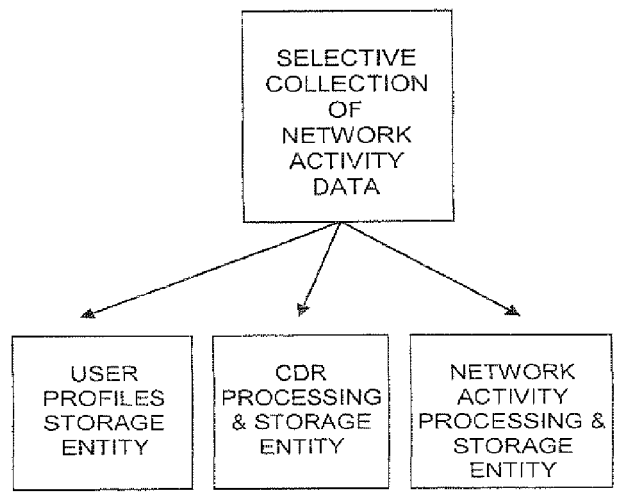
FIG. 10 illustrates a mechanism for building a structure of contact structure data according to another embodiment of the invention.

Next, in FIG. 10, a mechanism for building a structure of contact structure data according to another embodiment of the invention is illustrated. In detail, relevant information from the parties' interactions in the telephone network is selectively collected. A selective collection of network activity data may be provided from different entities, as shown in FIG. 10, for example a user profile storage entity, a CDR (call detail record) processing and storage entity, and a network activity processing and storage entity.

The user profile storage entity can be, for example, a centralized repository storing user data, e.g. static and/or dynamic, of a plurality of users subscribed to an operator's network, which is commonly used when some service is to be provided/adapted to a user.

A simplified embodiment of a user profiles storage entity is a Home Location Register HLR, or a Home Subscriber Server HSS. The network activity processing and storage entity can be an entity in a telecommunications system keeping track and/or monitoring access to services. A simple embodiment of this latest entity can be an. Authorization Authentication and Accounting AAA server. Other server entity types (not shown in the simplified illustration of FIG. 10) can also be used to collect some specific information, e.g. a server providing detailed geographical location information. A mechanism as illustrated therein allows building information about social network structure of a plurality of subscribers of a telecommunications system, by collecting from the appropriate server information such as: outgoing and incoming call duration with other subscribers, e.g. values of a certain subscriber can be calculated with his average values, duration and number of accesses to certain services, geographical proximity between users, etc.

In the following, specific examples of the present invention are discussed with respect to FIGS. 11 to 14, particularly describing aspects of generating contact structure data, analyzing this data and adapting a service according to the analysis.

Figure 11:
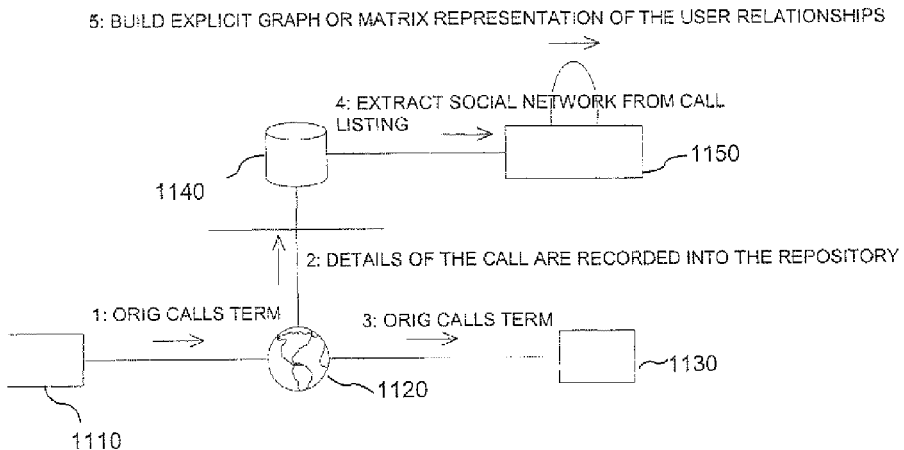
FIG. 11 illustrates schematically how information about a social network may be extracted according to a specific example of the present invention.

FIG. 11 shows schematically how information about a social network may be extracted. In FIG. 11, a telephone party 1110, from where a call is originating, calls another telephone party 1130, where the call is terminating, by using the telephone network 1120. This network 1120 may be a GSM network or other suitable telephone network. It is also feasible to use a fixed line telephone network (POTS) instead of a mobile network or a combination thereof.

Once the call is received in the telephone network 1120, details of the call are recorded in a repository 1140, which is a call data repository.

Any kind of data repository may be used that complies with the following two conditions, namely that the repository stores user data, which can be uniquely assigned to the same single user as the rest of the repositories, and that the repository stores information regarding interactions between two users by SMSs, phone calls, etc. For example, the repository 1140 is a database of a telecom operator, as discussed above.

The information stored in the repository 1140 can be either recorded from information sent on messages needed to set up a teleservice or bearer service from the party equipment to the network, or from the explicit transfer of user-meaningful data stored in the party equipment, like in an existing contact list, such as present in an address book of the party equipment.

For a single party or user, an estimator of the bond strength between the user and another user may be established, based on certain aspects of the interactions to generate a model based on contact structure data. This estimator may hold enough information to incrementally update the model, with or without forgetting previous experience.

The contact structure data is generated in a computing unit 1150 to extract a social network from call listings and build up contact structure data, which may be represented by a graph or a matrix representation of the user relationships as described with respect to FIGS. 6A and 6B.

In a concrete example, two relevant aspects in GSM telephony to describe social proximity are the number of SMS sent from party A to party B and the total duration of the calls performed from party A to party B. An estimator of the bond strength between A and B may then be built as follows.

SMSMonth (A,B)=SMS sent from $A$ to $B$ per month

SMSMonthRatio $(A,B)$=SMSmonth $(A,B)$/total SMS sent by $A$

CallDurationMonth (A,B)=total sum of call durations for calls from A to B

CallDurationMonthRatio $(A,B)$=CallDurationMonth $(A,B)$/total sum of call durations performed by $A$ Estimator $(A,B)$=$a$*SMSMonthRatio $(A,B)$+$(1-a)$*CallDurationMonthRatio $(A,B)$ where a can be selected from a [0,1] range. However, any function (linear or otherwise) that spans the [0,1] range and that can be obtained from data relevant to user-to-user interaction can be selected.

Figure 12:
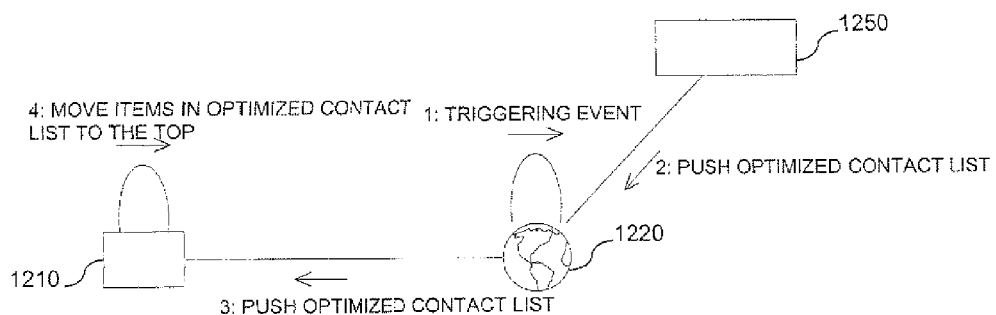
FIG. 12 illustrates an operation of an automatic push mechanism according to a specific example of the present invention.

In a next example, an automatic push mechanism is described with respect to FIG. 12. Here, a contact list, for example a contact list of an address book of a party equipment, such as a mobile phone, may be used to generate or refine contact structure data. In detail, for example, the M most popular contacts for a specific user, e.g., those with the highest estimator, can be selected as shown in FIG. 12.

In FIG. 12, a triggering event is any network event that will cause the contact list to be downloaded to a party equipment 1210 through the telephone network 1220. For example, following the triggering event, a computing unit 1250 may push the contact list through the telephone network to the party equipment 1210. In particular, if the pushed contact list is an optimized contact list, the items of the contact list may be moved to the top of the contact list of the party equipment.

Examples of triggering events are an initial network attachment, a network timer or an indication that the optimized contact list has significantly changed.

The extracted model of the social network based on contact structure data can also be traversed to find out the best path from a user A to a user B according to some arbitrary criteria, such as maximum bond rating sum along the path, and offer to provide direct communication path between them, which, for example, can preserve the privacy of the contacted party.

Figure 13:
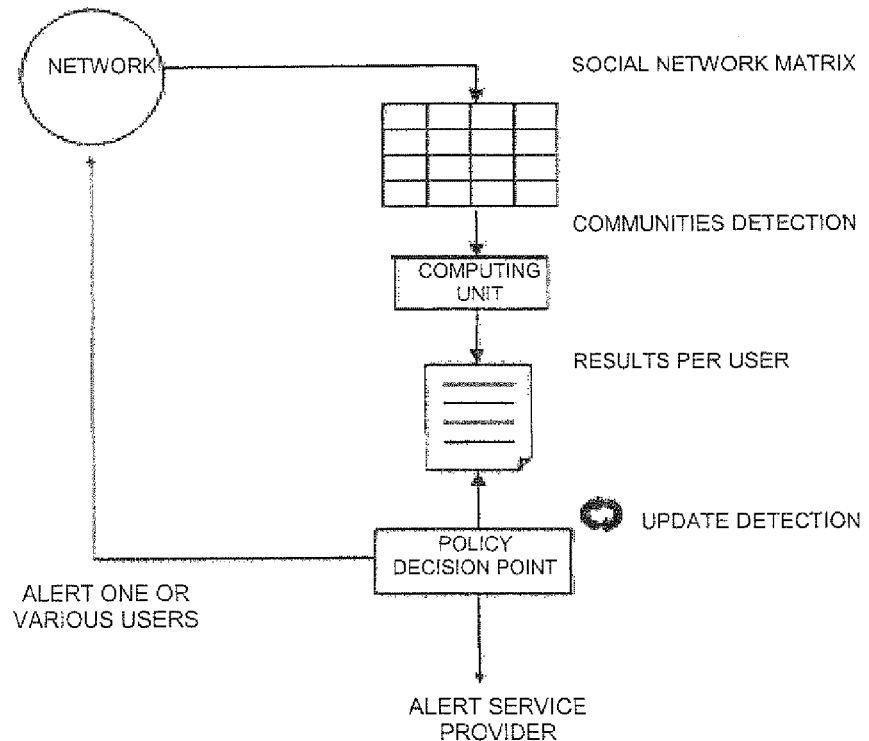
FIG. 13 illustrates adaptation of a multi-party service using the analysis of contact structure data according to the present invention.

In the next example described with respect to FIG. 13, the social network model can be analyzed to infer communities, e.g. by the clique percolation method described previously. The output of this analysis may comprise a number of communities, and user IDs pertaining to each of these communities.

This information can be stored on a per-user basis, listing for each user a community ID he belongs to, which may be randomly assigned, and the other user IDs belonging to the same community. This information can be stored in a text-like data storage or in a suitable data structure.

The model can be recalculated at a pre-determined time interval, in order to input new obtained network communications. The output of this repeated calculation will be a similar but updated graph, e.g. in graph representation, containing new links or weighting the existing ones in a different way, including the removal of non-active links. The new model can be compared to the last one, or to a historical sequence of models, or to a weighted historical sequence of models that assign growing importance to the last outputs.

The communities detected in this updated model may differ from those detected before. This difference can be stored on a per user or per community basis. If a difference is greater than a predetermined threshold, an alert may be sent either to one or more users or to the service provider as shown in FIG. 13.

Analysis of the behaviour of existing cliques to determine if potential new parties should be invited to become parties of the group may be performed after each update. A recurring communication activity between one or more parties of an existing OTT service, towards a non-member, can lead to the conclusion that this new party should be invited, according to the policies established by that community.

In a similar way, the opposite approach may be adopted, removing non-active members, according to predefined or suggested policies based on the duration of the inactivity, for example.

The above discussed operations are shown in FIG. 13, where a matrix representation of the social network is generated from telephone communication data of a network, the computing unit detects communities and results are presented per user. In this example, a pre-defined policy is reviewed and a decision is made either to alert one or various users or to alert the telecom operator.

This alert may be sent via means established by the telecom operator or decided by the user himself, e.g. an SMS message, an e-mail or synchronization message as described above.

After recalculation of the model at a predetermined time interval to take into account new network communications, this updated model can be analyzed to obtain new betweenness for each user. This process may be performed automatically so that always an updated model of the social network is considered.

Next, an example of the analysis of the contact structure data and especially its use will be described with respect to FIG. 14.

Several applications of contact structure data and the resulting social network associated with a user are possible ranging from technical considerations regarding the structure and usage of network resources, as discussed above, to marketing aspects.

For example, users may be identified, which are relatively important within the social networks they belong to. Their importance is given by the different computed measures of their centrality degree. A node with a high centrality degree is supposed to have a higher popularity than a node with a lower one, which has been described above. High centrality nodes are supposed to better connect the different users of a community, contributing positively to the overall connectivity of the network.

Therefore, analysis of the contact structure data allows the identification of parties of a social network with a high relative centrality. These parties can be computed and offered to marketing or third party service providers, as target customers for certain campaigns. Campaigns may be chosen based on the social network identified to ensure that the message to be conveyed is appealing.

For example, the analysis of a social network may be used for viral marketing which is a technique that uses pre-existing social networks to produce an increase in brand awareness, through self-replicating viral processes, analogous to the spread of pathological and computer viruses.

Figure 14:
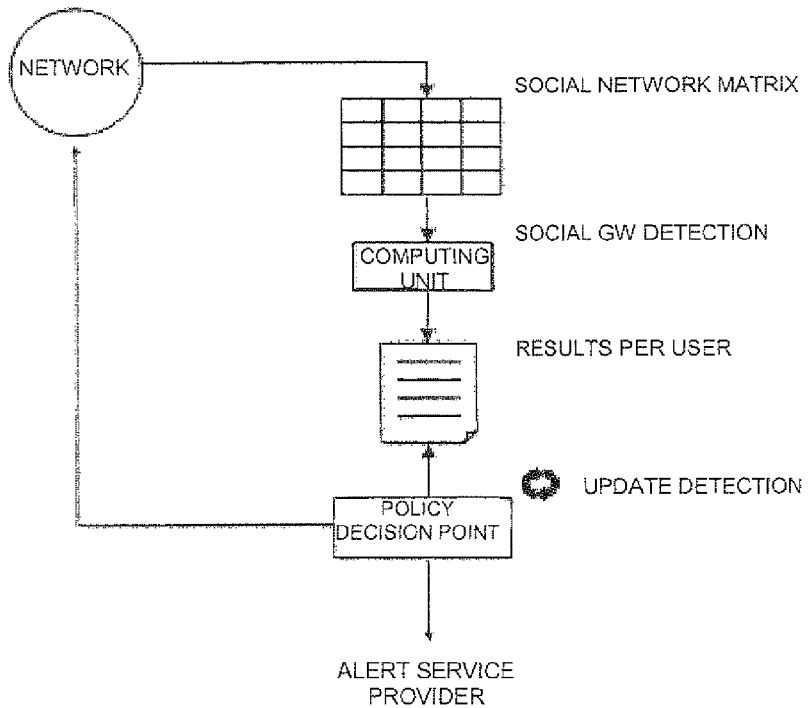
FIG. 14 illustrates a specific example of the analysis of contact structure data according to the present invention.

The process of dynamic identification of the nodes of the overall social network (the whole subscriber base) with a high centrality degree and social network potential is described in FIG. 14.

In FIG. 14, contact structure data is generated from telephone communication data of the telephone network and is represented in matrix representation. This matrix is then analyzed, for example to detect a social gateway based on its betweenness or centrality, as discussed above.

Subsequently, the results per user may be generated and a decision is made whether to alert the telecom operator or service provider, for example. The alert may be sent via means established by the telecom operator operating the network, or decided by the user himself, e.g. an SMS message, an email or a synchronization message.

Afterwards, the contact structure data may be updated and the analysis repeated. Similarly to the previous situation, the differences to the previous analysis and detection can be stored on a per user basis. For example, if a difference is greater than a predetermined threshold, an alert may be sent to a service provider, as shown in FIG. 14.

The computation of a certain type of node, e.g. social gateway in FIG. 14, can be offered as a dynamic service, where the results are subject to change at any time.

According to another embodiment, a program may be provided including instructions adapted to cause a data processor that may be included in the inference engine 100, 300, 800 to carry out combinations of the above-described operations.

The program or elements thereof may be stored in a memory, such as ROM or RAM or other suitable storage device of the inference engine 100, 300, 800, and retrieved by the processor for execution.

Moreover, a computer readable medium may be provided, in which the program is embodied. The computer readable medium may be tangible such as a disk or other data carrier or may be constituted by signals suitable for electronic, optic or any other type of transmission. A computer program product may comprise the computer readable medium.

The above embodiments and examples of the invention may allow the user to receive relevant information about his social network, e.g. who are the most contacted people in a contact list and who are the people that contact the user the most, without setting up the list explicitly. The user may also configure his multi-party services to match his actual social contacts, which often diverge from the perceived social contacts, wherein this configuration may also be performed automatically. The user may also be protected from massive marketing campaigns, since marketing companies can target only some users specifically.

Further, the invention may allow the telecom operator to optimize the service for a user according to the interaction of the user, for example by providing customized charging plans. Additionally, user loyalty may be increased, since having all of your community within the same operator can prove advantageous for the users.

Furthermore, multi-party service providers may optimize their service offerings, tailoring them to the actual contacts in the underlying social network.

In addition to the above applications, other applications of the contact structure data inferred per user are possible, such as map and weave nationwide volunteer network, find emergent leaders in a fast growing company, build a grass roots political campaign, or find an organization's go-to people in various knowledge domains.

It should be understood that the operations described herein are not inherently related to any particular device or engine and may be implemented by any suitable combination of components. The engines, entities and units described in detail above constitute preferred embodiments to perform the operations of the described methods. However, this may not be limited to the same.

It will be apparent to those skilled in the art that various modifications and variations can be made in the engines, entities, units and methods of the invention as well as in the construction of this invention without departing from the scope of or spirit of the invention.

The invention has been described in relation to particular embodiments and examples which are intended in all respects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less then all features of a single foregoing disclosed implementation or configuration. Thus, the true scope and spirit of the invention is indicated by the following claims.

The invention claimed is:

1. A method of processing telephone communication data, the method comprising:
   obtaining telephone communication data that associates telephone parties, identifiable by telephone network identifiers, with usage data that describes usage of one or more services of a telephone network,
   generating contact structure data for a set of said telephone parties based on said telephone communication data, said contact structure data expressing a degree of connectivity between each member of at least a part of said set and one or more other members of said set, the degree of connectivity being based at least in part on a duration, frequency and number of interactions between members of the set of said telephone parties,
   analyzing the contact structure data to identify a subset of said set of telephone parties, and
   adjusting a network service of a telephone party based on the analysis of the contact structure data, the adjusting a network service including at least one of the following:
      providing a secure communication for said telephone party,
      increasing the throughput of the communications of said telephone party,
      adapting a service charge for said telephone party, and
      adapting a multi-party service to said telephone party.

2. The method of processing telephone communication data of claim 1, wherein analyzing the contact structure data is based on interactions between said members of the set of said telephone parties, said interactions being obtainable from said telephone communication data.

3. The method of processing telephone communication data of claim 1, further comprising:
   analyzing the contact structure data to identify a cluster of telephone parties of said set with telephone parties of said cluster having at least one of a degree of connectivity above a certain connectivity threshold and a number of links to other telephone parties above a certain link threshold.

4. The method of processing telephone communication data of claim 1, wherein said contact structure data can be represented as a graph of nodes connected by edges, where each node corresponds to a member of said set and a given edge expresses a degree of connectivity between nodes connected to said given edge.

5. The method of processing telephone communication data of claim 1, wherein the degree of connectivity is represented by a weight for a link between a member of at least said part of said set and another member of said set.

6. The method of processing telephone communication data of claim 1, wherein the connectivity is undirected indicating that the degree of connectivity is the same for each direction between two members.

7. The method of processing telephone communication data of claim 1, wherein the connectivity is directed indicating that the degree of connectivity is different for each direction between two members.

8. The method of processing telephone communication data of claim 1, wherein the usage data includes information on an interaction between telephone parties through said telephone network.

9. The method of processing telephone communication data of claim 8, wherein the information on an interaction relates to an interaction in a service comprising at least one of: voice call, video call, 8MS, MM8, multimedia service, and instant messaging, and to information obtained from a location service.

10. The method of processing telephone communication data of claim 1, wherein the usage is associated with at least one of duration, frequency, and absolute number of interactions.

11. The method of processing telephone communication data of claim 1, wherein a telephone party is a trusted telephone party with a trusted telephone network identifier.

12. The method of processing telephone communication data of claim 1, wherein the telephone network identifier of the telephone party constitutes a unique identifier providing a unique identification in the telephone network.

13. The method of processing telephone communication data of claim 1, wherein generating contact structure data for a set of said telephone parties is further based on a location of a telephone party and party equipment data of a telephone party relating to one of a capability of the party equipment and contact information stored therein.

14. An inference engine of processing telephone communication data, the inference engine comprising:
   an obtainer configured to obtain telephone communication data that associates telephone parties identifiable by telephone network identifiers with usage data that describes usage of one or more services of a telephone network,
   a generator configured to generate contact structure data for a set of said telephone parties based on said telephone communication data, said contact structure data expressing a degree of connectivity between each member of at least a part of said set and one or more other members of said set, the degree of connectivity being based at least in part on a duration, frequency and number of interactions between members of the set of said telephone parties,
   a data analyzer configured to analyze the contact structure data, and
   a service adjuster configured to adjust a network service of a telephone party based on the analysis of the contact structure data, the adjusting a network service including at least one of the following:
      providing a secure communication for said telephone party,
      increasing the throughput of the communications of said telephone party,
      adapting a service charge for said telephone party, and
      adapting a multi-party service to said telephone party.

15. The inference engine of claim 14, wherein the data analyzer is adapted to analyze the contact structure data to identify a subset of said set of telephone parties.

16. The inference engine of claim 15, wherein the data analyzer is further configured to analyze the contact structure data to identify said subset based on interactions between said telephone parties, said interactions being obtainable from said telephone communication data.

17. The inference engine of claim 14, wherein the data analyzer is further configured to analyze the contact structure data to identify a cluster of telephone parties of said set with telephone parties of said cluster having at least one of a degree of connectivity above a certain connectivity threshold and a number of links to other telephone parties above a certain link threshold.

18. The inference engine of claim 14, wherein said contact structure data can be represented as a graph of nodes connected by edges, where each node corresponds to a member of said set and a given edge expresses a degree of connectivity between nodes connected to said given edge.

19. The inference engine of claim 14, wherein the degree of connectivity is represented by a weight for a link between a member of at least said part of said set and another member of said set.

20. The inference engine of claim 14, wherein the connectivity is undirected indicating that the degree of connectivity is the same for each direction between two members.

21. The inference engine of claim 14, wherein the connectivity is directed indicating that the degree of connectivity is different for each direction between two members.

22. The inference engine of claim 14, wherein the usage data includes information on an interaction between said telephone parties through said telephone network.

23. The inference engine of claim 22, wherein the information on an interaction relates to an interaction in a service comprising at least one of: voice call, video call, SMS, MMS, multimedia service, and instant messaging; and to information obtained from a location service.

24. The inference engine of claim 14, wherein the usage is associated with at least one of duration, frequency, and absolute number of interactions.

25. The inference engine of claim 14, wherein a telephone party is a trusted telephone party with a trusted telephone network identifier.

26. The inference engine of claim 14, wherein the telephone network identifier of the telephone party constitutes a unique identifier providing a unique identification in the telephone network.

27. The inference engine of claim 14, wherein the generator is configured to generate contact structure data for a set of said telephone parties based on at least one of a location of a telephone party and party equipment data of a telephone party relating to one of a capability of the party equipment and contact information stored therein.

* * * * *